United States Patent [19]

Saito

[11] Patent Number: 5,414,421
[45] Date of Patent: May 9, 1995

[54] KEYBOARD CONTROL SYSTEM AND METHOD FOR A COMPUTER TO WHICH A TEN-KEY PAD IS CONNECTABLE

[75] Inventor: Toshimitsu Saito, Tokyo, Japan

[73] Assignee: Kabushiki Kaisha Toshiba, Kawasaki, Japan

[21] Appl. No.: 899,902

[22] Filed: Jun. 17, 1992

[30] Foreign Application Priority Data

Jun. 17, 1991 [JP] Japan .................. 3-144725

[51] Int. Cl.⁶ .................. H03K 17/94; G06F 3/00
[52] U.S. Cl. .................. 341/22; 364/709.14
[58] Field of Search .................. 341/22–23; 364/709.14–709.15; 400/477, 479; 345/168, 172

[56] References Cited

U.S. PATENT DOCUMENTS 4,823,311  4/1989  Hunter et al. .............. 364/709.14 X
5,144,567  9/1992  Delsch et al. .................. 341/22 X

FOREIGN PATENT DOCUMENTS 0010830  1/1982  Japan .................. 341/22
0172435  10/1982  Japan .................. 341/22
0090136  5/1984  Japan .................. 341/22
2121224  12/1983  United Kingdom .................. 341/26

OTHER PUBLICATIONS

Stilwell, "Multi-Function Keypad", *IBM Tech. Discl. Bulletin*, vol. 25, No. 5, Oct. 1992.

*Primary Examiner*—John K. Peng
*Assistant Examiner*—Thomas J. Mullen
*Attorney, Agent, or Firm*—Oblon, Spivak, McClelland, Maier & Neustadt

[57] ABSTRACT

In a computer to which an external ten-key pad is connectable, whether or not the external ten-key pad is connected to the computer is detected. When the external ten-key pad is not connected, the overlay keys in the keyboard body function as letter keys or numeric keys depending on whether the computer is set in an NL state. When the external ten-key pad is connected, the overlay keys function as letter keys only.

16 Claims, 6 Drawing Sheets

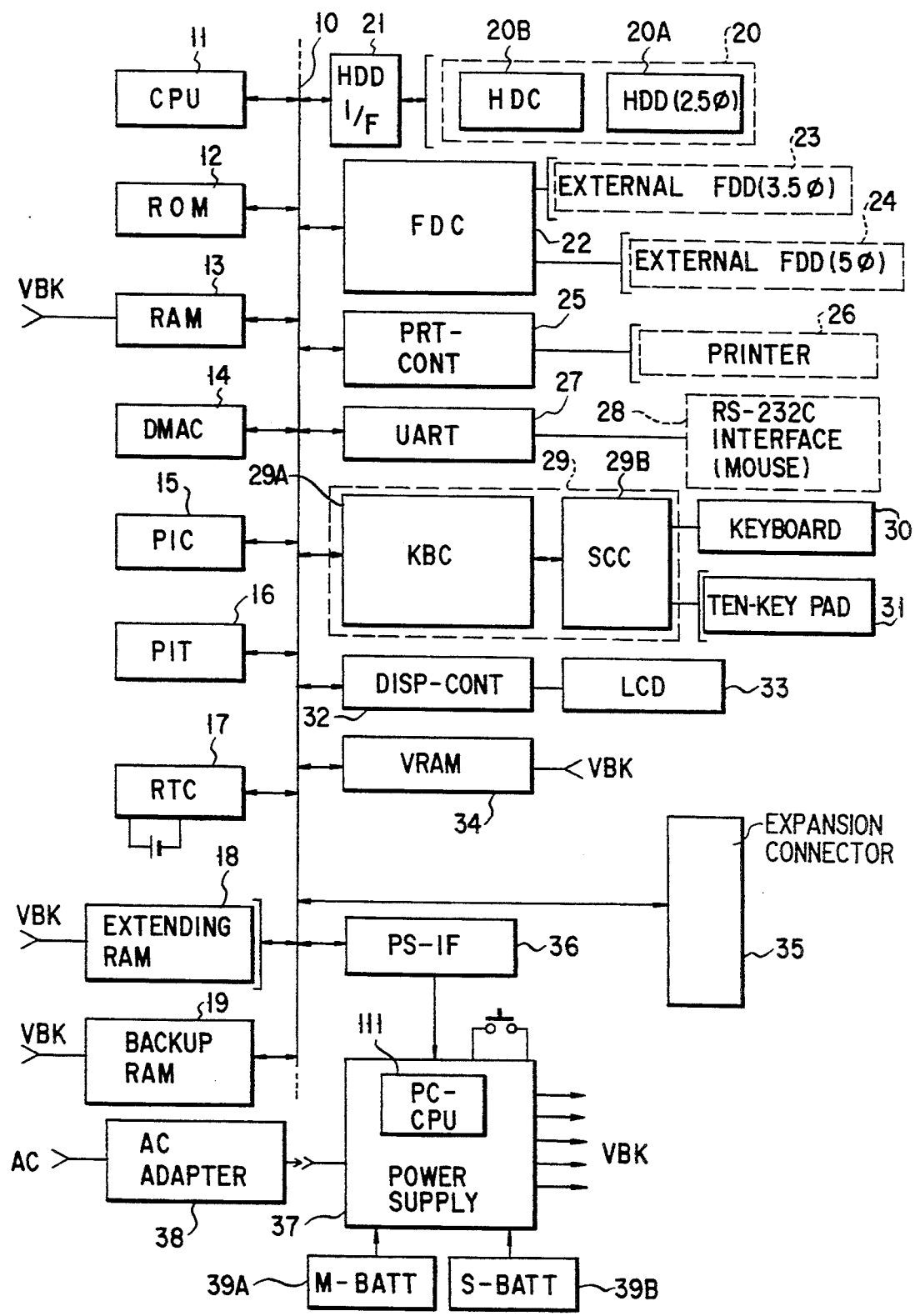
F I G. 1

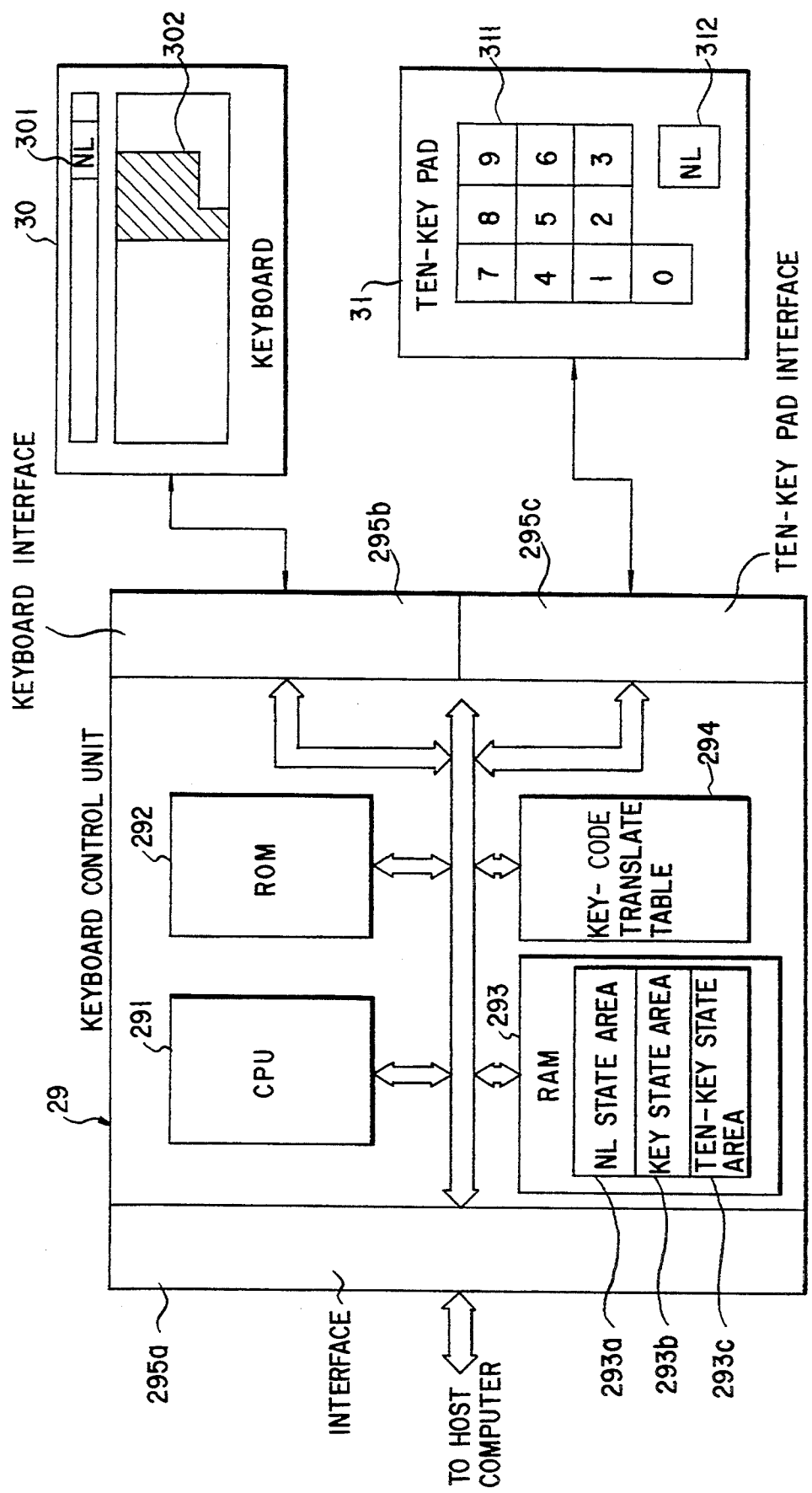
F I G. 2

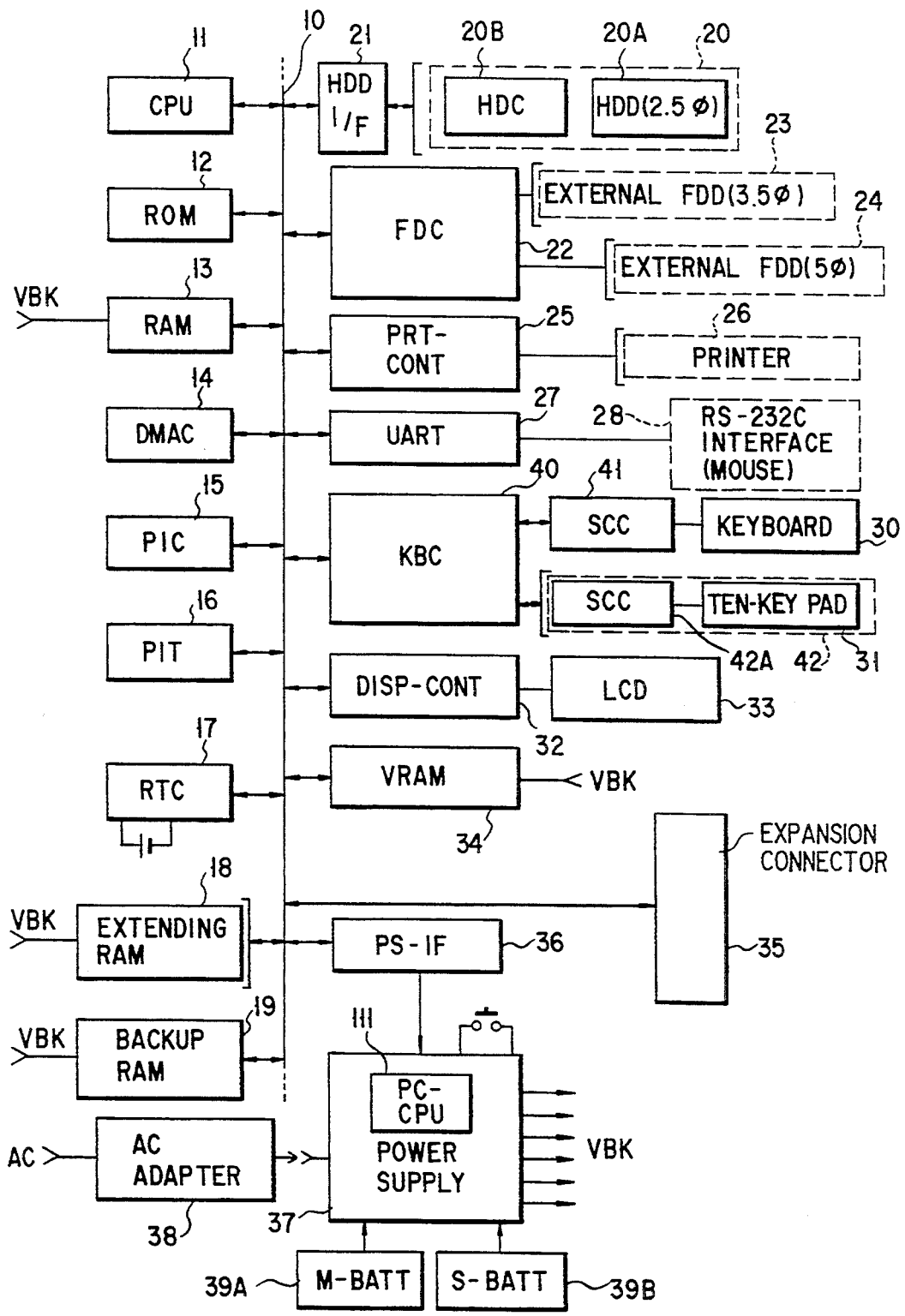
F I G. 4

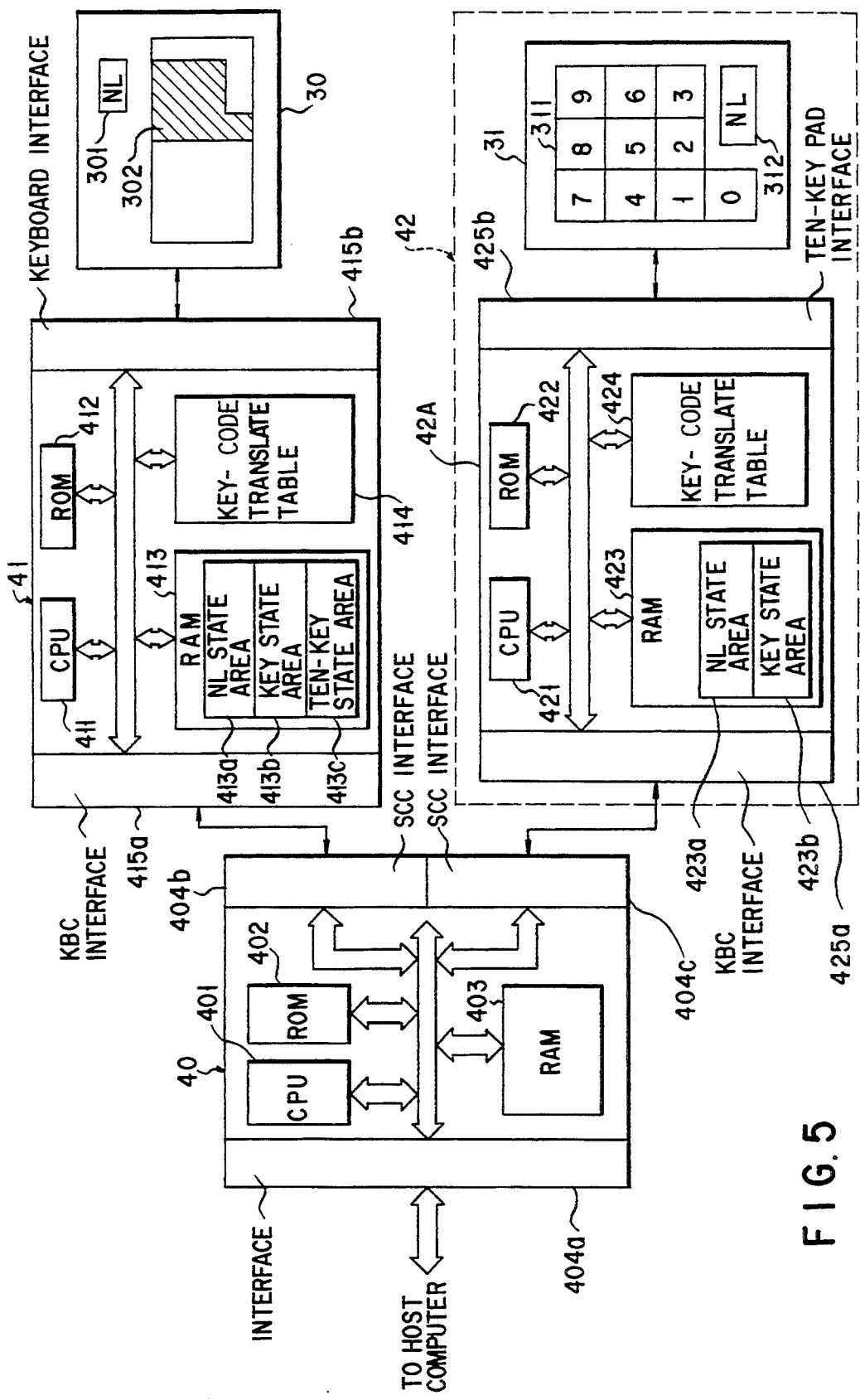
F I G. 5

KEYBOARD CONTROL SYSTEM AND METHOD FOR A COMPUTER TO WHICH A TEN-KEY PAD IS CONNECTABLE

BACKGROUND OF THE INVENTION

1. Field of the Invention

The present invention relates to a keyboard control apparatus wherein an external ten-key pad is connectable to a keyboard body for use in a personal computer or the like.

2. Description of the Related Art

In general, a personal computer has a keyboard, i.e., a data input apparatus, and a display apparatus, i.e., a data output apparatus, which are formed integrally as one piece. The keyboard has various character keys necessary to data input. Recently, however, in a type of personal computer, exclusive numeric keys (ten keys) are not provided and character keys can also be used as numeric keys in order to make the apparatus compact.

The personal computer of this type has overlay keys, which are used as letter keys in a normal state and as numeric keys in a special state (a Numeric Lock State, abbreviated as an NL state). The keyboard apparatus is set in the NL state by operating an NL key. The overlay keys are thus used as letter keys and numeric keys; however, when the two states are frequently switched, the key input efficiency is greatly reduced.

To overcome this drawback, in a type of keyboard apparatus, an external ten-key pad is detachably connected to the keyboard body. When the external ten-key pad is connected to the keyboard body, numbers are input through the external ten-key pad, instead of overlay keys. The external ten-key pad has an NL key as described above, and the keys thereof can be used as, for example, cursor keys in a normal state and as numeric keys in an NL state by operating the NL key.

However, if the NL key of the external ten-key pad is operated to set an NL state so that the ten keys function as numeric keys, the overlay keys in the keyboard body also function as numeric keys, not the normal letter keys. Hence, to use the overlay keys as the normal letter keys, a key operation for resetting the NL state is required.

For example, after the NL key is depressed to set a mode to use the keys of the ten-key pad as numeric keys, if the user wishes to input Roman letters by using overlay keys of the keyboard body, the NL key should be depressed again to release the set mode. The reverse is also conceivable. Thus, the user cannot use the keys of the ten-key pad as numeric keys and the overlay keys of the keyboard body as Roman letter keys, without changing the mode (without operating the NL key).

SUMMARY OF THE INVENTION

It is accordingly an object of the present invention to provide a keyboard control apparatus for performing key input operation by using an external ten-key pad connected to a keyboard body, wherein overlay keys on the keyboard body function as normal letter keys when the external ten-key pad is used as numeric keys, thereby increasing the key input efficiency.

To achieve the object, according to the present invention, a keyboard control apparatus comprises: a keyboard body including overlay keys used as letter keys in a first mode and numeric keys in a second mode, and an NL key to set the second mode; an external ten-key pad including a plurality of keys used as numeric keys in a third mode and non-numeric keys in a fourth mode, and an NL key to set the third mode; connection recognizing means for recognizing whether the external ten-key pad is connected to the keyboard body and storing connection data representing the recognition result; and key code control means for reading the connection data stored in the connection recognizing means, determining whether the ten-key pad is connected to the keyboard body, and if it is recognized that the ten-key pad is not connected to the keyboard body, when one of the overlay keys of the keyboard body is operated, generating a letter key code corresponding to the operated key in the first mode and a numeric key code corresponding to the operated key in the second mode in accordance with the set state of the NL key.

According to a second aspect of the present invention, a keyboard control apparatus comprises: a keyboard body including overlay keys used as letter keys in a first mode and numeric keys in a second mode and an NL key to set the second mode; an external ten-key pad including a plurality of keys used as numeric keys in a third mode and non-numeric keys in a fourth mode and an NL key to set the third mode; connection recognizing means for recognizing whether the external ten-key pad is connected to the keyboard body and storing connection data representing the recognition result; first key code control means for reading the connection data stored in the connection recognizing means, determining whether the ten-key pad is connected to the keyboard body, and if it is recognized that the ten-key pad is connected to the keyboard body, when one of the overlay keys of the keyboard body is operated, generating a letter key code corresponding to the operated key; and second key code control means for reading the connection data stored in the connection recognizing means, determining whether the ten-key pad is connected to the keyboard body, and if it is recognized that the ten-key pad is connected to the keyboard body, when one of the keys of the external ten-key pad is operated, generating a numeric key code corresponding to the operated key in the third mode and a non-numeric key code corresponding to the operated key in the fourth mode in accordance with the set state of the NL key.

According to a third aspect of the present invention, a keyboard control method for controlling a keyboard body having overlay keys which are used as letter keys in a first mode and as numeric keys in a second mode and an NL key to set the second mode, and an external ten-key pad having a plurality of keys used as numeric keys in a third mode and as non-numeric keys in a fourth mode and an NL key to set the third mode, the method comprises the steps of: a) recognizing whether the external ten-key pad is connected to the keyboard body and storing connection data representing the recognition result; b) reading the connection data stored in the step a), determining whether the ten-key pad is connected to the keyboard body, and if it is recognized that the ten-key pad is not connected to the keyboard body, when one of the overlay keys of the keyboard body is operated, generating a letter key code corresponding to the operated key in the first mode and a numeric key code corresponding to the operated key in the second mode in accordance with the set state of the NL key.

According to a fourth aspect of the present invention, a keyboard control method for controlling a keyboard body having overlay keys which are used as letter keys in a first mode and as numeric keys in a second mode and an NL key to set the second mode, and an external ten-key pad having a plurality of keys used as numeric keys in a third mode and as non-numeric keys in a fourth mode and an NL key to set the third mode, the method comprises the steps of: a) recognizing whether the external ten-key pad is connected to the keyboard body and storing connection data representing the recognized result; b) reading the connection data stored in the step a), determining whether the ten-key pad is connected to the keyboard body, and if it is recognized that the ten-key pad is connected to the keyboard body, when one of the overlay keys of the keyboard body is operated, generating a letter key code corresponding to the operated key; and c) reading the connection data stored in the step a), determining whether the ten-key pad is connected to the keyboard body, and if it is recognized that the ten-key pad is connected to the keyboard body, when one of the keys of the external ten-key pad is operated, generating a numeric key code corresponding to the operated key in the third mode and a non-numeric key code corresponding to the operated key in the fourth mode in accordance with the set state of the NL key.

With the above structure, when the external ten-key pad is connected to the keyboard body, even if the NL state is set by the NL key of the keyboard body, a character key code can be generated in response to a key input operation using the overlay keys. When the NL state is set by the NL key of the external ten-key pad, a numeric key code is generated in response to a key input operation using the keys of the external ten-key pad. And when the NL state is not set by the NL key of the external ten-key pad, another key code is generated in response to a key input operation using the keys of the external ten-key pad. In other words, when the external ten-key pad is connected to the keyboard body, the function of generating numeric key codes by a key input operation using the overlay keys is invalidated, even if the NL state is set by the NL key of the keyboard body, and normal letter key codes can be generated instead. Therefore, when the external ten-key pad is connected to the keyboard body, the letter input operation in the keyboard body is prior to the numeric input operation, thereby improving the efficiency of the key input operation.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing the overall structure of a personal computer using the keyboard control apparatus and method according to a first embodiment of the present invention;

FIG. 2 is a block diagram showing the detailed structure of the keyboard controller, the keyboard, and the ten-key pad shown in FIG. 1, and the connection among them;

FIG. 4 is a block diagram showing the overall structure of a personal computer using the keyboard control apparatus and method according to a second embodiment of the present invention; and FIG. 5 is a block diagram showing the detailed structure of the KBC (keyboard controller), the SCC (scan controller), the keyboard, and the external ten-key unit, and the connection among them.

DETAILED DESCRIPTION OF THE PREFERRED EMBODIMENTS

Figure 3A:
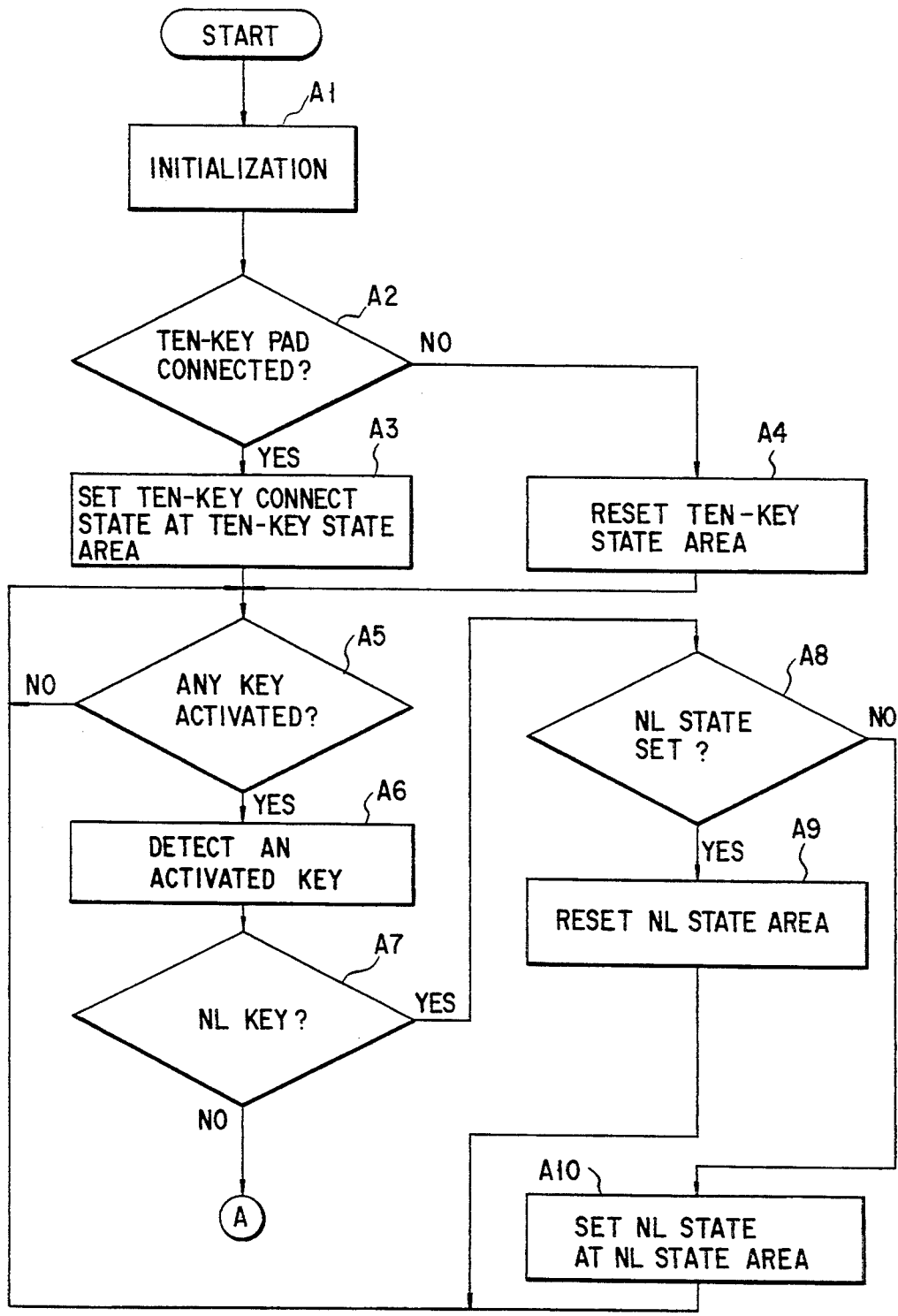
FIGS. 3A and 3B are flow charts for explaining an operation of the present invention.

Embodiments of the present invention will now be described with reference to the accompanying drawings.

FIG. 1 shows the overall structure of a personal computer using the keyboard control apparatus and method according to a first embodiment of the present invention. Elements of the personal computer are connected to a system bus 10. A CPU (Central Processing Unit) 11 controls the overall system of the personal computer. The CPU also acts as a host CPU of a power control CPU 111.

A ROM (Read Only Memory) stores a fixed program, data, and the like. A RAM (Random Access Memory) stores a program and data to be processed, and also a resume mode flag and the like. A DMA (Direct Memory Access) controller 14 controls direct memory access.

A PIC (Programmable Interrupt Controller) 15 can be set by a program and outputs an interruption signal. A PIT (Programmable Interval Timer) 16 can be set by a program and counts down within a set time period. An RTC (Real Time Clock) 17 has an exclusive power battery (not shown) and counts the current time. An extended RAM 18 has a memory of relatively large capacity and is detachably inserted into an exclusive card slot of the body of the personal computer. The extended RAM 18 is supplied with a back-up power (VBK). A backup RAM 19 stores data for recognizing the resume function and data representing the system structure set in the setup time, and is supplied with the back-up power (VBK).

A hard disk pack 20 is detachably inserted into an exclusive housing section of the keyboard body to transmit/receive data to/from the CPU 11 via an HDD I/F (Hard Disk Drive Interface) 21. The hard disk pack 20 comprises an HDD (Hard Disk Drive) 20A of, for example, 2.5 inches and an HDC (Hard Disk Controller) 20B for controlling access to the drive 20A. A reference numeral 22 denotes an FDC (Floppy Disk Controller). If necessary, an external FDD (Floppy Disk Drive) 23 (for 3.5-inch disks) and an external FDD (Floppy Disk Drive) 24 (for 5-inch disks) are connected to the FDC 22. A reference numeral 25 denotes a PRT-CNT (Printer Controller), to which a printer 26 can be connected, if necessary. A reference numeral 27 denotes a UART (Universal Asynchronous Receiver Transmitter, Input/Output Interface), to which an interface unit 28 can be connected, if necessary. The interface unit 28 includes an RS-232C interface unit and the like.

A keyboard control unit 29 comprises a KBC (Keyboard Controller) 29A and an SCC (Scan Controller) 29B. The SCC 29B is connected to a keyboard 30, and if necessary, to an external ten-key pad 31.

A DISP-CONT (Display Controller) 32 is connected to an LCD (Liquid Crystal Display) 33. A CRT (Cathode Ray Tube) can be connected to the DISP-CONT 32, if necessary. A VRAM (Video RAM) 34 is supplied with the back-up power (VBK) and stores image data. An expansion connector 35 can be connected to an expansion unit into which an option card is inserted.

A PS-IF (Parallel/Serial-Interface) 36 is connected to a power supply circuit 37 and also to the CPU 11 via the system bus 10. PS-IF is a parallel-serial interface which receives parallel data from the host CPU 11 and converts it into serial data to be output to the PC-CPU 111. Alternatively, it converts the data from the PC-CPU 111 into parallel data to host CPU 11.

An AC adapter (power source adapter) 38 rectifies and smooths a commercial alternate current (AC) to obtain a direct current of a predetermined potential. The AC adapter 38 is inserted into the main body of the personal computer. The power supply circuit 37 supplies power to the elements of the computer.

A battery 39A operates as an M-BATT (Main Battery) and constituted by a rechargeable battery. The M-BATT 39A is detachably connected to the power supply circuit 37. A battery 39B, which is incorporated in the main body of the personal computer, operates as an S-BATT (Sub-Battery) and constituted by a rechargeable battery.

FIG. 2 shows the structures and functions of the keyboard control unit 29, the keyboard 30, and the external ten-key pad 31, and the connection among them. In FIG. 2, the KBC 29A and the SCC 29B of the keyboard control unit 29 are not discriminated from each other in structure and function.

The keyboard control unit 29 is connected to the keyboard 30, and if necessary, to the external ten-key pad. The keyboard control unit 29 comprises a CPU 291 for controlling the overall operation thereof, a ROM 292 for storing the program for operating the CPU 291, a RAM 293 for storing various control data, a key code converting table 294 for obtaining a key code from a return signal and a scan signal, an interface 295a for interfacing with the host computer, an interface 295b for interfacing with the keyboard, and an interface 295c for interfacing with the external ten-key pad. The RAM 293 includes an NL state area 293a for storing an NL state, a key state area 293b for storing a key state (state change) as operated, and a ten-key state area 293c for storing the connection state as to whether the external ten-key pad 31 is connected to the keyboard control unit. The keycode converting table 294 stores pairs of return signals and scan signals, and key codes in one-to-one correspondence.

The keyboard 30 comprises letter keys, cursor keys, and overlay keys 302 which can be used as letter keys and numeric keys. It also comprises an NL key 301 to set an NL state when the user wishes to use the overlay keys 302 as numeric keys. The overlay keys 302 can be used as numeric keys by operating the NL key 301 to initiate the NL state. The NL state is reset by operating the NL key 301 again.

The external ten-key pad 31 has ten keys 311, i.e., numeric keys, and an NL key 312. Some of the ten keys 311 function as cursor keys in a normal state (when the NL state is reset). The NL key 312 is used to set/reset the NL state by toggling in accordance with the operator's operation like the above-mentioned NL key of the keyboard. The external ten-key pad 31 is detachably connected to the keyboard control unit 29.

Figure 3B:
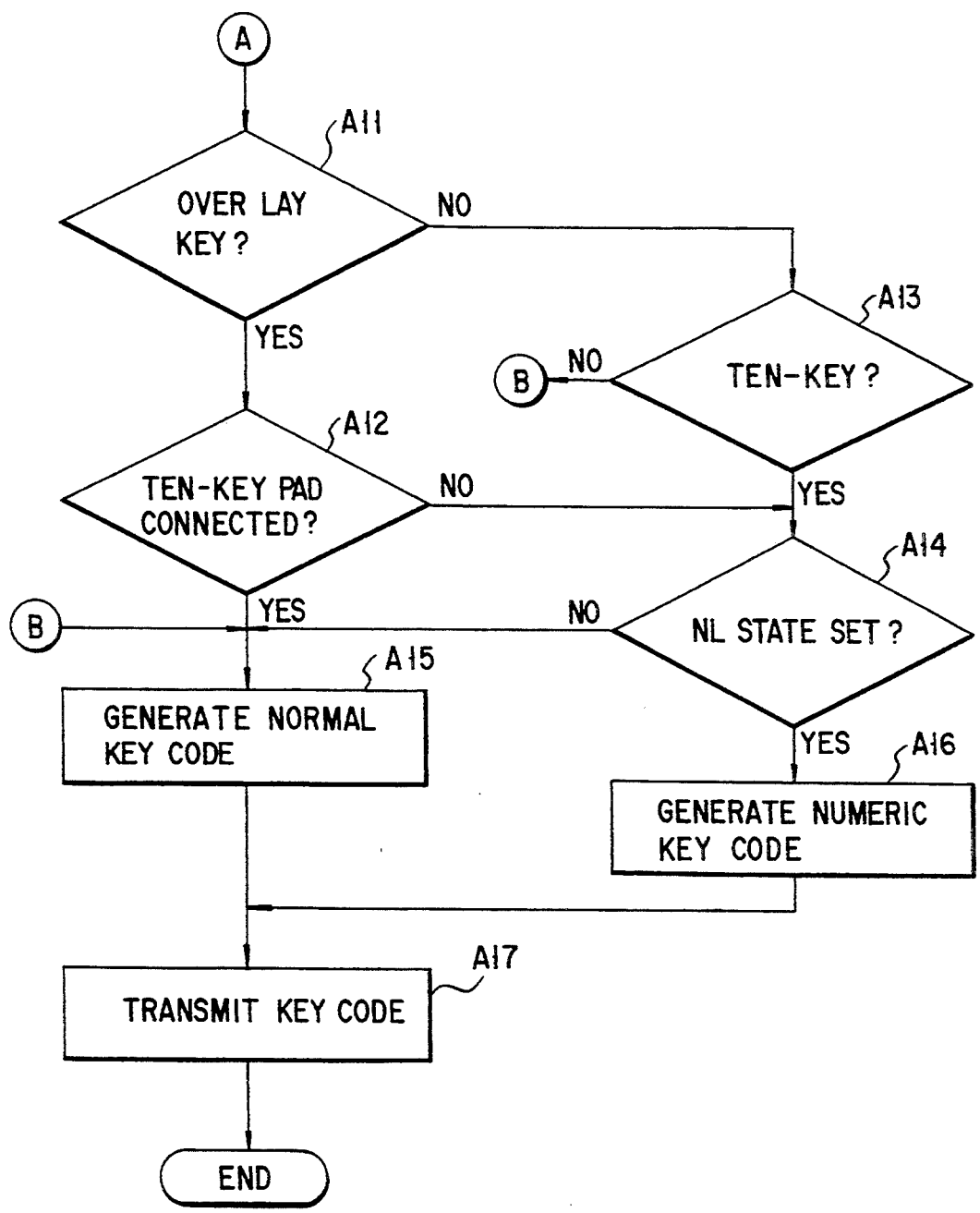

An operation of the above embodiment will now be described with reference to the flow charts of FIGS. 3A and 3B.

When the personal computer is turned on, the RAM 293 and the like are initialized (step A1). The CPU 291 of the keyboard control unit 29 recognizes whether the external ten-key pad 31 is connected (step A2). This recognition is performed by means of a conventional technique, a detailed explanation thereof is omitted.

The following are explanations in a case where the external ten-key pad 31 is not connected to the keyboard control unit 29. In step A2, if it is determined that the external ten-key pad 31 is not connected, the CPU 291 resets the ten-key state area 293c (step A4). Then, the keyboard control unit 29 stands by for a key operation, as scanning the keyboard 30 (if "NO" in step A5). If any key in the keyboard 30 is operated (if "YES" in step A5), a return signal in accordance with the key operation is transmitted from the keyboard 30 through the keyboard interface 295b to the keyboard control unit 29. The CPU 291 temporarily stores, in the key state area 293b of the RAM 293, a number corresponding to the received return signal, and a number corresponding to a scan line when a key is activated (step A6).

The CPU 291 determines whether the operated key is the NL key 301 (step A7). If "YES" in step A7, the CPU 291 detects whether the NL state is set in the NL state area 293a of the RAM 293 (step A8).

If the NL state has been set in step A8, the CPU 291 resets the NL state (step A9). If the NL state area 293a is reset in step A8, it is set in the NL state (step A10). When this NL state control operation is concluded, the flow returns to step A5, i.e., the keyboard control unit stands by for a key operation.

If a key operation is detected in step A5 and the operated key is not the NL key 301 (if "NO" in step A7), it is determined whether the operated key is one of the overlay keys 302 (step A11). In step A11, if it is recognized that an overlay key 302 is operated, the CPU 291 determines whether the external ten-key pad 31 is connected to the keyboard control unit based on the data stored in the ten-key state area 293c of the RAM 293 (step A12). Since this explanation of the embodiment relates to the case where the external ten-key pad 31 is not connected, the flow advanced to the "NO" loop in step A12.

The CPU 291 determines whether the NL state is set on the basis of the data stored in the NL state area 293a (step A14). If the NL state is not set, the overlay keys 302 function as normal letter keys (alphabet keys). That is, the CPU 291 converts the data stored in the key state area 293b in response to the operation of the overlay key 302 to a specific character key code by using the key code converting table 294 (step A15). On the other hand, if the NL state has been set in step A14, the overlay keys 302 function as numeric keys. That is, the CPU 291 converts the data stored in the key state area 293b in response to the operation of the overlay key 302 to a predetermined numeric code by using the key code converting table 294 (step A16).

In step A11, if it is recognized that the operated key is not an overlay key 302, i.e., if a normal key is operated (if "NO" in step A11), it is determined whether the operated key is one of the ten keys 311 of the external ten-key pad 31 (step A13). Since this explanation of the embodiment relates to the case where the external ten-key pad 31 is not connected, the flow advanced to the "NO" loop in step A13, and the CPU 291 converts the data stored in the key state area 293b in response to the operation of the letter key to a predetermined character key code by using the key code converting table 294 (step A15).

The key code generated in step A15 or A16 is transmitted to the host computer via the interface 295a (step A17).

The following are explanations in a case where the external ten-key pad 31 is connected to the keyboard control unit 29. In step A2, if it is determined that the external ten-key pad 31 is connected, the CPU 291 stores data representing that the external ten-key pad 31 is connected in the ten-key state area 293c (step A3). Then, the keyboard control unit 29 stands by for a key operation, as scanning the keyboard 30 (if "NO" in step A5). If any key in the keyboard 30 or the external ten-key pad 31 is operated (if "YES" in step A5), a return signal in accordance with the key operation is transmitted from the keyboard 30 to the keyboard control unit 29 through the keyboard interface 295b if the operated key is in the keyboard 30, or through the ten-key pad interface 295c if the operated key is in the ten-key pad 31. The CPU 291 temporarily stores, in the key state area 293b of the RAM 293, a number corresponding to the received return signal, and a number corresponding to a scan line when a key is activated (step A6).

When the keyboard control unit 29 stands by for a key operation, if the NL key 312 in the external ten-key pad 31 is operated, the subsequent operations are similar to those in the above-described case where the external ten-key pad 31 is not connected to the keyboard control unit and the NL key 301 in the keyboard 30 is operated. Therefore, the descriptions thereof are omitted.

If the operated key detected in step A5 is one of the ten keys 311 of the external ten-key pad 31, i.e., it is not the NL key 312 (if "NO" in step A7), it is determined that the operated key is not an overlay key 302 ("NO" in step A11) but one of the ten keys 311 of the external ten-key pad 31 ("YES" in step A13). The CPU 291 determines whether the NL state is set with reference to the data stored in the NL state area 293a (step A14). If the NL state is set, the ten keys 311 function as numeric keys. That is, the CPU 291 converts the data stored in the key state area 293b in response to the operation of one of the ten keys 311 to a predetermined numeric key code by using the key code converting table 294 (step A16). If the NL state has not been set in step A14, the ten keys 311 function as cursor keys. That is, the CPU 291 converts the data stored in the key state area 293b in response to the operation of one of the ten keys 311 to a predetermined cursor key code by using the key code converting table 294 (step A15).

If the operated key detected in step A5 is one of the letter keys in the keyboard 30, i.e., it is not the NL key 312 (if "NO" in step A7), it is determined that the operated key is neither an overlay key 302 ("NO" in step A11) nor one of the ten keys 311 of the external ten-key pad 31 ("NO" in step A13). The operated letter key functions as a normal letter key. That is, the CPU 291 converts the data stored in the key state area 293b in response to the operation of the letter key to a predetermined letter key code by using the key code converting table 294 (step A15).

If the operated key detected in step A5 is one of the overlay keys 302 of the keyboard 30, the flow advances to the "YES" loop in step A11. Then, the CPU 291 determines whether the external ten-key pad 31 is connected to the keyboard control unit with reference to the ten-key state area 293c (step A12). Since this explanation of the embodiment relates to the case where the external ten-key pad 31 is connected, the flow advanced to the "YES" loop in step A12. The overlay key 302 functions as a normal letter key. That is, the CPU 291 converts the data stored in the key state area 293b in response to the operation of the overlay key 302 to a predetermined letter key code by using the key code converting table 294, whether the NL state is set or not (step A15).

The key code generated in step A15 or A16 is transmitted to the host computer via the interface 295a (step A17).

FIG. 4 shows the overall structure of a personal computer using the keyboard control apparatus and method according to a second embodiment of the present invention. As shown in FIG. 4, a KBC 40 is connected to a system bus 10 to transmit/receive data to/from the elements of the personal computer. The KBC 40 is connected to an SCC 41, which is connected to a keyboard 30.

If necessary, an external ten-key unit 42 can be connected to the KBC 40. The external ten-key unit 42 comprises an SCC 42A and a ten-key pad 31. All of the elements of the personal computer shown in FIG. 4 are the same as in FIG. 1 except for the above elements, and the descriptions of the same elements are omitted.

FIG. 5 shows the function and structure of the KBC 40, the SCC 41, the keyboard 30, and the external ten-key unit 42, and the connection among them.

The KBC 40 comprises a CPU 401 for controlling the overall operation thereof, a ROM 402 for storing the program for operating the CPU 401, a RAM 403 for storing various control data, an interface 404a for interfacing with the host computer, an interface 404b for interfacing with the SCC 41, and an interface 404c for interfacing with the external ten-key unit 42.

The KBC 40 is connected to the SCC 41. The SCC 41 comprises a CPU 411 for controlling the overall operation thereof, a ROM 412 for storing the program for operating the CPU 411, a RAM 413 for storing various control data, a key cord converting table 414 for obtaining a key code from a return signal and a scan signal output from the keyboard 30, an interface 415a for interfacing with the KBC 40, and an interface 415b for interfacing with the keyboard. The RAM 413 includes an NL state area 413a for storing an NL state, a key state area 413b for storing a key state (state change) as operated in the keyboard 30, and a ten-key state area 413c for storing connection state as to whether the external ten-key unit 42 is connected to the KBC 40. The key code converting table 414 stores pairs of return signals and scan signals, and key codes in one-to-one correspondence.

The keyboard 30 comprises letter keys, cursor keys, and overlay keys 302 which can be used as letter keys and numeric keys. It also comprises an NL key 301 to set an NL state, when the overlay keys 302 are to be used as numeric keys.

The external ten-key unit 42 can be connected to the KBC 40, if necessary. The external ten-key unit 42 is constituted by the SCC 42A and the ten-key pad 31. The SCC 42A comprises a CPU 421 for controlling the overall operation thereof, a ROM 422 for storing the program for operating the CPU 421, a RAM 423 for storing various control data, a key cord converting table 424 for obtaining a key code from a return signal and a scan signal, an interface 425a for interfacing with the KBC 40, and an interface 425b for interfacing with the ten-key pad 31. The RAM 423 includes an NL state area 423a for storing an NL state and a key state area 423b for storing a key state (state change) as operated in the ten-key pad 31. The key code converting table 424 stores pairs of return signals and scan signals, and key codes in one-to-one correspondence.

The external ten-key pad 31 has ten keys 311, i.e., numeric keys, and an NL key 312. Some of the ten keys 311 function as cursor keys in a normal state (when the NL state is reset).

An operation of the second embodiment will now be described with reference to the flow charts of FIGS. 3A and 3B.

When the personal computer is turned on, the RAM 403, 413, 423 and the like are initialized (step A1). The CPU 401 of the KBC 40 determines whether the external ten-key unit 42 is connected (step A2). The connection is recognized by means of a conventional technique, a detailed explanation thereof is omitted.

The following are explanations in a case where the external ten-key unit 42 is not connected to the KBC 40. In step A2, if it is determined that the external ten-key unit 42 is not connected, the CPU 401 transmits a command to the SCC 411 to reset the ten-key state area 413c of the RAM 413. When the CPU 411 receives the command via the KBC interface 415a, it resets the ten-key state area 413c of the RAM 413 (step A4). Then, the SCC 41 stands by for a key operation, as scanning the keyboard 30 (if "NO" in step A5). If any key in the keyboard 30 is operated (if "YES" in step A5), a return signal in accordance with the key operation is transmitted from the keyboard 30 to the SCC 41. The CPU 411 temporarily stores, in the key state area 413b, a number corresponding to the received return signal via the keyboard interface 415b, and a number corresponding to a scan line when a key is activated (step A6).

The CPU 411 determines whether the operated key is the NL key 301 (step A7). If "YES" in step A7, the CPU 411 detects whether the NL state (step A8) is set in the NL state area 413a. If the NL state has been set, the CPU 411 resets the NL state area (step A9). If the NL state area 293a is not set in the NL state, it is set in the NL state (step A10). When this NL state control operation is concluded, the flow returns to step A5, i.e., the keyboard control unit stands by for a key operation.

If a key operation is detected in step A5 and the operated key is not the NL key 301 (if "NO" in step A7), it is determined whether the operated key is one of the overlay keys 302 (step A11). In step A11, if it is recognized that an overlay key 302 is operated, the CPU 411 determines whether the external ten-key unit 42 is connected to the KBC 40 based on the data stored in the ten-key state area 413c of the RAM 413 (step A12). Since this explanation of the embodiment relates to the case where the external ten-key unit 42 is not connected, the flow advanced to the "NO" loop in step A12.

The CPU 411 determines whether the NL state is set on the bases of the data stored in the NL state area 413a (step A14). If the NL state is not set, the overlay keys 302 function as normal letter keys (alphabet keys). That is, the CPU 411 converts the data stored in the key state area 413b in response to the operation of the overlay key 302 to a predetermined character key code by using the key code converting table 414 (step A15). On the other hand, if the NL state has been set in step A14, the overlay keys 302 function as numeric keys. That is, the CPU 411 converts the data stored in the key state area 413b in response to the operation of the overlay key 302 to a predetermined numeric code by using the key code converting table 414 (step A16).

In step A11, if it is recognized that the operated key is not an overlay key 302, i.e., if a normal key is operated (if "NO" in step A11), it is determined whether the operated key is one of the ten keys 311 in the external ten-key unit 42 (step A13). Since this explanation of the embodiment relates to the case where the external ten-key unit 42 is not connected, the flow advanced to the "NO" loop in step A13, and the CPU 411 converts the data stored in the key state area 413b in response to the operation of the letter key to a predetermined character key code by using the key code converting table 414 (step A15).

The key code generated in step A15 or A16 is transmitted to the KBC 40 via the KBC interface 415a. The CPU 401 of the KBC 40 transmits the key code to the host computer via the interface 404a (step A17).

The following are explanations in a case where the external ten-key unit 42 is connected to the KBC 40. In step A2, if it is determined that the external ten-key unit 42 is connected, the CPU 401 transmits a command to the SCC 41 to store data representing that the external ten-key unit 42 is connected in the ten-key state area 413c (step A3). Then, the SCC 41 and the SCC 42A stand by for a key operation, as scanning the keyboard 30 and the ten-key pad 31, respectively (if "NO" in step A5).

If any key in the ten-key pad 31 is operated (if "YES" in step A5), a return signal in accordance with the key operation is transmitted to the CPU 421 of the SCC 42A through the ten-key pad interface 425b. The CPU 421 temporarily stores, in the key state area 423b, a number corresponding to the received return signal, and a number corresponding to a scan line when a key is activated (step A6). When a key in the keyboard 30 is operated, the CPU 411 receives the return signal in response to the operated key. The CPU 411 temporarily stores, in the key state area 413b in the RAM 413, a number corresponding to the received return signal, and a number corresponding to a scan line when a key is activated. (step A6)

If the operated key is an NL key 312 in the ten-key pad 31 (if "YES" in step A7), the CPU 421 determines whether the NL state is set in NL state area 423a (step A8). If the NL state is set, the NL state area 423a is reset (step A9). If the NL state area is reset, the NL state is set (step A10). When this NL state control operation is concluded, the flow returns to step A5, i.e., the keyboard control unit stands by for a key operation.

If the operated key detected in step A5 is one of the ten keys 311 of the ten-key pad 31, (if "NO" in steps A7 and step A11 and "YES" in step A13), the CPU 291 determines whether the NL state is set with reference to the data stored in the NL state area 423a (step A14). If the NL state is not set, the ten keys 311 function as cursor keys. That is, the CPU 421 converts the data stored in the key state area 423b in response to the operation of one of the ten keys 311 to a predetermined cursor key code by using the key code converting table 424 (step A15). If the NL state is set in step A14, the ten keys 311 function as numeric keys. That is, the CPU 421 converts the data stored in the key state area 423b in response to the operation of one of the ten keys 311 to a predetermined numeric key code by using the key code converting table 424 (step A16).

If the operated key detected in step A5 is one of the letter keys in the keyboard 30 (if "NO" in steps A7, A11, and A13), The CPU 411 converts the data stored in the key state area 413b in response to the operation of the letter key to a predetermined letter key code by using the key code converting table 414 (step A15).

If the operated key recognized in step A5 is an overlay key 302 of the keyboard 30 (if "NO" in step A7 and "YES" in step A11), the CPU 411 determines whether the external ten-key unit 42 is connected to the KBC 40 with reference to the ten-key state area 413c (step A12). Since, as described above, the ten-key state area 413c stores data representing that the ten-key unit 42 is connected when the power is turned on, the flow advances to "YES" in step A12. Therefore, the overlay key 302 functions as a normal letter key. That is, the CPU 411 converts the data stored in the key state area 413b in response to the operation of the overlay key 302 to a specific character key code by using the key code converting table 414, whether the NL state is set or not (step A15).

When the external ten-key unit 42 is connected to the KBC 40, the key code generated in step A15 or A16 is transmitted to the KBC 40 via the KBC interface 415a or 425a. The CPU 401 transmits it to the host computer via the interface 404a (step A17).

Thus, when the external ten-key pad 31 or the ten-key unit 42 is connected to the keyboard body, the overlay keys 302 of the keyboard 30 do not function as numeric keys, but function only as letter keys in accordance with a key operation.

In the above embodiments, whether the exclusive ten-key pad is connected to the keyboard is detected when the personal computer or the like is turned on. The KBC 40 can recognize whether the exclusive ten-key pad is connected to the keyboard by sequentially polling the SCC 41 and the SCC 42A while the personal computer is operating. That is, it may be detected while the personal computer is operating, in which case the same operation control as in the embodiments can be performed, even if the ten-key pad is connected to the keyboard during the operation of the personal computer.

As has been described above in detail, according to the present invention, when an exclusive ten-key pad is connected to a keyboard apparatus, the character input operation in the keyboard body is prior to the numeral input operation, resulting in improvement of the efficiency of the key input operation.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A keyboard control apparatus comprising:
 a keyboard body including overlay keys used as letter keys in a first mode and numeric keys in a second mode, and an NL (Numeric Lock) key to switch between said first and second modes;
 an external ten-key pad including a plurality of keys used as numeric keys;
 means for determining whether said external ten-key pad is connected to said keyboard body; and
 key code control means for generating a letter key code in response to an operated overlay key of said keyboard body, irrespective of which mode is set by the NL key, if said means for determining determines that said ten-key pad is connected to said keyboard body.

2. A keyboard control apparatus according to claim 1, wherein said key code control means comprises storage means for storing status data representing whether the second mode is set, in response to operation of said NL key.

3. A keyboard control apparatus according to claim 2, wherein said key code control means comprises means for reading the stored status data and determining whether the second mode is set.

4. A keyboard control apparatus according to claim 3, wherein said storage means toggles the status data in accordance with each operation of said NL key of said keyboard body.

5. A keyboard control apparatus according to claim 1, wherein said keyboard body comprises an interface for exchanging data with said external ten-key pad, said ten-key pad being connected to the interface.

6. A keyboard control apparatus comprising:
 a keyboard body including overlay keys used as letter keys in a first mode and numeric keys in a second mode and a first NL (Numeric Lock) key to switch between said first and second modes;
 an external ten-key pad including a plurality of keys used as numeric keys in a third mode and non-numeric keys in a fourth mode and a second NL key to switch between said third and fourth modes;
 means for determining whether said external ten-key pad is connected to said keyboard body;
 first key code control means for generating a letter key code in response to an operation of one of the overlay keys of said keyboard body, irrespective of which mode is set by the first NL key, if said means for determining determines that said ten-key pad is connected to said keyboard body; and
 second key code control means for, if said means for determining determines that said ten-key pad is connected to said keyboard body, and if one of the keys of said external ten-key pad is operated, generating a numeric key code in response to the operated key in the third mode and a non-numeric key code in response to the operated key in the fourth mode in accordance with the mode set by the second NL key.

7. A keyboard control apparatus according to claim 6, wherein said second key code control means comprises storage means for storing status data representing whether the third mode is set, in response to operation of said first and second NL keys.

8. A keyboard control apparatus according to claim 7, wherein said second key code control means comprises second determination means for reading the stored status data and determining whether the third mode is set.

9. A keyboard control apparatus according to claim 8, wherein, if said second determination means determines that the third mode is not set, and if a predetermined key in said ten-key pad is operated, a cursor key code corresponding to the operated key is generated.

10. A keyboard control method for controlling a keyboard body having overlay keys which are used as letter keys in a first mode and as numeric keys in a second mode and an NL (Numeric Lock) key to switch between said first and second modes, and an external ten-key pad having a plurality of keys used as numeric keys, said method comprising the steps of:
- a) determining whether the external ten-key pad is connected to the keyboard body; and
- b) if it is determined that said ten-key pad is connected to said keyboard body, generating a letter key code in response to an operation of an overlay key of said keyboard body irrespective of which of the first and second modes is set by the NL key.

11. A keyboard control method according to claim 10, further comprising the step of storing status data representing whether the second mode is set, in response to operation of said NL key of said keyboard body.

12. A keyboard control method according to claim 11, further comprising the step of reading the stored status data.

13. A keyboard control method for controlling a keyboard body having overlay keys which are used as letter keys in a first mode and as numeric keys in a second mode and a first NL (Numeric Lock) key to switch between said first and second modes, and an external ten-key pad having a plurality of keys used as numeric keys in a third mode and as non-numeric keys in a fourth mode and a second NL key to switch between said third and fourth modes, said method comprising the steps of:
- a) determining whether the external ten-key pad is connected to the keyboard body; and
- b) if said determining step determines that said ten-key pad is connected to said keyboard body, generating a letter key code in response to an operation of one of the overlay keys of said keyboard body, irrespective of which mode is set by the first NL key;

wherein if said determining step determines that said ten-key pad is connected to said keyboard body, and if one of the keys of said external ten-key pad is operated, a numeric key code corresponding to the operated key is generated in the third mode and a non-numeric key code corresponding to the operated key is generated in the fourth mode in accordance with the mode set by the second NL key.

14. A keyboard control method according to claim 13, further comprising the step of storing status data representing whether the third mode is set, in response to operation of said NL keys.

15. A keyboard control method according to claim 14, further comprising the step of reading the stored status data and determining whether the third mode is set.

16. A keyboard control method according to claim 15, wherein if the step of determining determines that the third mode is not set and if a predetermined key in said ten-key pad is operated, a cursor key code corresponding to the operated key is generated.

* * * * *